2,767,160
Patented Oct. 16, 1956

2,767,160

NICKEL OXIDE ON CARBON-ALKALINE EARTH HYDRIDE CATALYST IN ETHYLENE POLYMERIZATION

Edmund Field, Chicago, and Morris Feller, Park Forest, Ill., assignors to Standard Oil Company, Chicago, Ill., a corporation of Indiana No Drawing. Application June 29, 1953,
Serial No. 364,913

15 Claims. (Cl. 260—94.9)

This invention relates to a process for the conversion of ethylene to normally solid, resinous, wax-like and grease-like hydrocarbon products by contact with an alkaline earth metal hydride and a nickel-carbon catalyst.

One object of our invention is to provide novel and highly useful catalysts for the preparation of high molecular weight polymers from ethylene-containing gas mixtures. Another object is to provide a relatively low-temperature, low-pressure process for the conversion of ethylene in substantial yields into high molecular weight normally solid polymers having molecular weights ranging upwardly from 300. These and other objects of our invention will become apparent from the following description thereof.

Briefly, the inventive process comprises the conversion of ethylene in substantial yields to high molecular weight polymers having a molecular weight of at least 300 and including grease-like, wax-like and tough, resinous ethylene polymers, by contacting ethylene with calcium hydride or other alkaline earth metal hydride and a nickel-activated carbon catalyst which comprises essentially elemental nickel and/or nickel oxide (NiO) in a minor proportion, usually between about 0.1 and about 20 w. percent calculated as elemental nickel, and a major proportion of activated carbon. The contacting is effected at temperatures within the range of about 20° C. to about 250° C. It is highly desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. The conversion of ethylene can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use. The ethylene partial pressure in the reaction zone can be varied between about atmospheric pressure and 15,000 p. s. i. g. or even higher pressures, but is usually effected at pressures between about 200 and about 5000 p. s. i. g., or most often at about 1000 p. s. i. g.

The practice of the process of the present invention leads to ethylene polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700 and wax-like ethylene homopolymers having an approximate specific viscosity ($\times 10^5$) between about 1000 and 40,000 [($\eta$ relative $-1$)$\times 10^5$] as determined with a solution of 0.125 g. polymer in 100 cc. of C. P. xylenes at 110° C.

The process of the present invention may be employed to effect the copolymerization of ethylene with other polymerizable materials, particularly with propylene, or other mono-olefinic hydrocarbons such as n-butylenes, isobutylenes, t-butylethylene; acetylene, butadiene, isoprene, and the like, usually in proportions between about 1 and about 25% by weight, based on the weight of ethylene.

Calcium hydride is an article of commerce and can be prepared by a variety of methods. Thus, metallic calcium reacts readily with hydrogen at 200° C. to produce calcium hydride. Calcium hydride can also be prepared by the reaction of CaO with magnesium and hydrogen, which produces calcium hydride containing MgO. Strontium hydride can be prepared by the reaction of a strontium halide with lithium aluminum hydride (A. E. Finholt et al., J. Am. Chem. Soc. 69, 1199–1203 (1947)). Beryllium and magnesium hydrides can be prepared by special methods known in the art. It will be understood that the specific preparative methods involved form no part of our invention and that any method which yields the desired metal hydride can be employed. Usually the hydrides employed according to the present invention are prepared outside the reactor, but they may be prepared in situ and polymerization can then be effected in the reactor.

The function or functions of the metal hydride in our process are not well understood. Thus, calcium hydride alone is not a catalyst for the polymerization of ethylene to yield high molecular weight, normally solid polymers under the conditions described herein. Yet calcium hydride co-functions somehow with the nickel-carbon catalyst to increase the productivity (polymer yield) of said catalyst.

The proportion of calcium hydride or other metal hydride employed in our process can be varied from about 0.01 to about 10 or more parts by weight per part by weight of nickel catalyst (total weight of solid catalyst), usually between about 0.1 and about 1.0 parts by weight. The optimum proportions can readily be determined in specific instances, by simple small-scale tests with the specific feed stocks, liquid reaction medium, reaction medium: catalyst ratio, catalyst, temperature, pressure and nature of the product which is desired. Usually, the metal hydride is employed in proportions between about 0.3 and about 2 parts by weight per part by weight of nickel catalyst at ratios between about 5 and about 3000 volumes or more, of liquid reaction medium per part by weight of nickel catalyst.

The nickel or nickel oxide component of the catalyst is extended upon a major proportion of an activated carbon, preferably an activated coconut charcoal. Thus, we may employ activated charcoals having surface areas between about 700 and about 1200 square meters per gram, pore volumes of about 0.53 to 0.58 cc. per gram and pore diameters of about 20 to 20 A, and, in some instances, small amounts of combined oxygen. Activated carbons are articles of commerce and we are not concerned with the specific preparative methods of such carbons. The activated charcoal or other carbon support may be pretreated with nitric acid before use as a catalyst support in order to remove basic materials, for example, as described in E. F. Peters application for United States Letters Patent, Serial No. 164,825, filed May 27, 1950, now U. S. Patent No. 2,692,295.

The preparation of nickel and/or NiO catalysts supported upon activated carbon, particularly activated charcoals, is well known in the art and the preparative methods form no part of the present invention. Usually we prefer to prepare the catalyst by a cheap, simple and efficacious technique, which is described briefly hereinafter.

A suitable method of catalyst preparation involves adsorbing nickel nitrate from an aqueous solution upon a porous active carbon such as a coconut charcoal in an amount sufficient to produce the desired nickel content in the finished catalyst. The charcoal containing adsorbed nickel salt is then treated thermally to effect decomposition of nickel nitrate to evolve oxides of nitrogen and to form nickel oxide, suitably by heating under a partial vacuum such as 1 to 20 mm. of mercury (absolute pressure) or, preferably, in the presence of steam. The resultant catalyst, comprising principally nickel oxide-charcoal, may be prereduced with hydrogen before use in polymerization to produce a catalyst comprising principally elemental nickel-charcoal. Hydrogen treatment of the nickel oxide-charcoal catalyst can be effected at temperatures between about 175° C. and about 400° C., preferably about 200° C. to 250° C., and hydrogen pressures ranging from about 1 mm. of mercury to about 2000 p. s. i. g. for a period of time sufficient to produce a substantial proportion of elemental nickel in the catalyst. An exemplary preparation of a nickel-charcoal catalyst is provided in Peters-Evering U. S. Patent application, Serial No. 222,802, filed April 25, 1951, now U. S. Patent No. 2,692,261.

Although the nickel catalyst may contain between about 0.1 and about 20 weight percent of nickel, calculated as the element, we usually employ catalysts containing between about 3 and about 10 weight percent of nickel.

The activated carbon support seems to play a unique role in the catalyst since we have found that other supports which might be considered prima facie equivalents, greatly reduce or virtually destroy the power of the catalyst to produce solid polymers from ethylene, viz. alumina and silica supports such as kieselguhr, as will be shown hereinafter.

The catalyst can be employed in various forms and sizes, e. g., as powder, granules, microspheres, broken filter cake, lumps, or shaped pellets. A convenient form in which the catalysts may be employed is as powder or granules of about 20–100 mesh/inch size range.

If it is desired to employ the nickel-active carbon catalyst in the form of pellets large enough to be retained on a 20 mesh sieve or at least about 0.1 inch in the largest dimension, it is desirable to pellet the nickel-carbon catalyst with between about 50 and about 95 weight percent, based on the total weight of the pellet, of a difficultly reducible metal oxide filler material such as alumina, titania, zirconia or silica. The pelleting of nickel-carbon catalyst with porous inert supporting materials (fillers) is described in Application for United States Letters Patent, Serial No. 259,508, filed on December 1, 1951 by B. L. Evering et al., which is incorporated herein by reference, now U. S. Patent No. 2,727,023.

Although ethylene may be polymerized to produce normally solid polymers in the presence of metal hydride-nickel-charcoal catalysts even at room temperature, we prefer to employ temperatures of at least about 75° C., extending up to about 150° C.

Reaction pressures may be varied within the range of about 50 p. s. i. ethylene partial pressure to the maximum ethylene partial pressure which can economically be employed in suitable commercial equipment, for example up to as much as 30,000 p. s. i. A convenient ethylene partial pressure range for the manufacture of solid polymers by the use of the present catalyst is about 200 to about 5000 p. s. i., which constitutes a distinct advantage over the commercial high pressure ethylene polymerization processes which apparently require operating pressures in the range of about 20,000 to about 50,000 p. s. i. g.

An important advantage which accrues to the conjoint employment of calcium hydride and nickel-charcoal catalyst is the fact that high solvent: catalyst ratios may be employed, for example ratios between about 5 and about 3000 cc. of solvent per gram of catalyst, under which conditions a markedly reduced yield of solid ethylene polymer would be obtained in the absence of the metal hydride.

The charging stock to the present polymerization process preferably comprises essentially ethylene. The ethylene charging stocks may contain inert hydrocarbons, as in refinery gas streams, for example, methane, ethane, propane, etc. However, it is preferred to employ as pure and concentrated ethylene charging stocks as it is possible to obtain. It is desirable to minimize or avoid the introduction of oxygen, carbon dioxide, water or sulfur compounds into contact with the catalyst.

The contact time or space velocity employed in the polymerization process will be selected with reference to the other variables, catalysts, the specific type of product desired and the extent of ethylene conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene, xylenes, or tetralin, or a cycloaliphatic hydrocarbon, such as decalin (decahydronaphthalene).

The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the solid catalyst particles or fragments may occur, resulting in catalyst carry-over as fines with the solution of polymerization products and extensive loss of catalyst from the reactor.

In batch operations, operating periods between one-half and about 10 hours, usually between about 1 and about 4 hours, are employed and the reaction autoclave is charged with ethylene as the pressure falls as a result of the olefin conversion reaction.

The olefin charging stocks can be polymerized in the gas phase and in the absence of a liquid reaction medium by contact with the metal hydrides and metal oxide catalysts. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is much preferred to effect the conversion of the olefin in the presence of suitable liquid reaction media. The liquid reaction medium may also be employed as a means of contacting the olefin with catalyst by preparing a solution of the olefin feed stock in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid and substantially inert under the polymerization conditions of the present process can be employed. Members of the aromatic hydrocarbon series, particularly the mononuclear aromatic hydrocarbons, viz. benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity-reducing hydrocarbon, such as those mentioned above, thereto in the reaction zone.

The liquid hydrocarbon reaction medium should be freed of poisons before use in the present invention by acid treatment, e. g., with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of $MoO_3$—$Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225°–250° C. with 8 w. percent molybdena-alumina catalyst plus either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

When solvents such as xylenes are employed some slight alkylation thereof by ethylene can occur under the reaction conditions. The alkylate is removed with grease in the present process, can be separated therefrom by fractional distillation and can, if desired, be returned to the polymerization zone.

The methods of polymerization and equipment described in our application for United States Letters Patent, Serial No. 324,607 may be employed without substantial change in employing the present catalyst.

The following specific examples are introduced in order to illustrate but not unduly to limit our invention. The exemplary operations were effected in stainless steel pressure vessels provided with a magnetically-actuated stirring device which was reciprocated through the liquid in the vessel in order to obtain good contacting of the ethylene and catalyst components.

*Example 1*

The catalyst was 5% nickel as nickel oxide supported upon activated wood charcoal, employed as a fine powder. Before use the catalyst was reduced with hydrogen at 220° C., atmospheric pressure, for 16 hours. The reactor (250 cc. volume) was charged with 150 cc. of dehydrated and decarbonated xylenes, 3 g. of the nickel catalyst and 1 g. of calcium hydride, under a blanket of inert gas. The reactor contents were heated to 176° C. and dehydrated and decarbonated commercial ethylene was then introduced into the reactor to a partial pressure of 1180 p. s. i. Reaction was effected for a period of 22 hours, over the course of which the total ethylene pressure drop was 3740 p. s. i. Ethylene was introduced into the reactor from time to time to maintain its pressure at a value of about 1000 p. s. i. The reaction yielded 227 weight percent, based on the nickel-charcoal catalyst, of a solid ethylene polymer having a specific viscosity of $6100 \times 10^{-5}$, melt viscosity of $6 \times 10^3$ poises and $d^{24}$ 0.9385. In addition, the reaction yielded 145 weight percent, based on the weight of nickel-charcoal catalyst, of a low melting, wax-like polyethylene.

*Example 2*

In this instance the catalyst was used without prior $H_2$ reduction. The catalyst was prepared by decomposition of nickel nitrate supported on charcoal in the presence of steam. The reactor was charged with 100 cc. of dehydrated and decarbonated xylenes, 2 g. of calcium hydride and 5 g. of 5% NiO-charcoal catalyst (which may have contained some elemental nickel due to the reducing action of charcoal on NiO). The reactor contents were then heated to 175° C. and dehydrated and decarbonated commercial ethylene was then introduced to a partial pressure of 1060 p. s. i. Ethylene was introduced into the reactor from time to time to maintain the initial partial pressure. Reaction was continued for 250 minutes, over the course of which the total ethylene pressure drop was 1710 p. s. i. The reaction yielded 107 weight percent, based on the weight of the nickel catalyst, of a solid ethylene polymer having a specific viscosity of $6000 \times 10^{-5}$, melt viscosity of $1.35 \times 10^3$ poises and $d^{24}$ 0.9444. The reaction also yielded 61 weight percent, based upon the weight of the nickel catalyst, of a solid grease-like ethylene polymer and 12 weight percent of xylenes alkylate.

*Example 3*

This example involves the employment of about the same ratios of reagents and the use of a lower reaction temperature than in Example 2. The reactor was charged with 50 cc. of purified xylenes, 1.5 g. of calcium hydride and 3 g. of the same catalyst as was employed in Example 2. The reactor contents were heated to 125° C. and purified ethylene was then introduced to a partial pressure of 1090 p. s. i., ethylene being introduced from time to time during the course of the reaction to maintain a value of about 1000 lbs. Reaction was continued for 325 minutes, over the course of which the ethylene pressure drop was 1010 p. s. i. The accumulation of solid ethylene polymer in the reactor almost caused the stirring mechanism to jam. The reaction yielded 154 weight percent, based on the weight of the nickel catalyst, of a solid ethylene polymer having a specific viscosity of $1600 \times 10^{-5}$, melt viscosity of $3.6 \times 10^4$ poises and $d^{24}$ 0.9528. The reaction also yielded 38 weight percent, based on the weight of the nickel catalyst, of a solid, grease-like ethylene polymer, together with some xylenes alkylate.

*Example 4*

This operation involved the employment of decalin solvent and 5000 p. s. i. reaction pressure. The catalyst was 5% nickel-charcoal, prereduced before use with hydrogen at 220° C., atmospheric pressure and 16 hours. The 100 cc. pressure vessel was charged with 25 cc. of decalin which had been contacted with silica gel, 2 g. of calcium hydride and 1 g. of the reduced nickel catalyst. The reactor contents were heated to 200° C., whereupon ethylene was introduced to the partial pressure of 5000 p. s. i. Reaction was conducted for 85 minutes, over the course of which the ethylene partial pressure dropped 3000 p. s. i. The reaction yielded 441 weight percent, based on the weight of nickel-charcoal catalyst, of a solid polymer having a specific viscosity of $5300 \times 10^{-5}$ and $d^{24}$ 0.9416. The reaction also yielded 170 weight percent of solid, grease-like ethylene polymer, together with a substantially smaller proportion of alkylated decalins.

The following operation illustrates the critical importance of the activated charcoal component of our catalyst. The reactor was charged with 100 cc. of dehydrated and decarbonated xylenes, 2 g. of calcium hydride and 5 g. of 30–60 mesh commercial, reduced, 60 weight percent nickel-kieselguhr catalyst. The reactor contents were heated to 125° C. and ethylene was then introduced to the initial partial pressure of 1100 p. s. i. Very pure ethylene was employed, containing only 3–4 p. p. m. of oxygen, no carbon dioxide and no water. The reaction temperature was varied up to 152° C., with corresponding variation in the ethylene partial pressure to 1235 p. s. i. Over the course of 140 minutes, the ethylene pressure drop was only 25 p. s. i., apparently due wholly to the solution of ethylene in the xylenes solvent. The operation yielded absolutely no solid or grease-like ethylene polymers.

An attempt was made to employ a catalyst of 8 w. percent NiO supported on activated alumina together with calcium hydride for the production of solid ethylene polymers, but no more than a trace of solid polymer was produced. The reaction medium was a dehydrated and decarbonated mixture of xylenes.

The polymers produced by the process of this invention can be subjected to such after-treatment as may be desired, to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to even a wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as parafin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

High molecular weight polyethylenes can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride, sulfonation, and other reactions to which hydrocarbons may be subjected.

Having thus described our invention, what we claim is:

1. A process for the preparation of an ethylene polymer having a molecular weight of at least about 300, which process comprises contacting ethylene with an alkaline earth metal hydride and a catalyst comprising essentially a minor proportion of a material selected from the class consisting of nickel and nickel oxide supported upon a major proportion of an active carbon at a temperature between about 20° C. and about 250° C., and separating an ethylene polymer having a molecular weight of at least about 300 thus produced.

2. The process of claim 1 wherein said hydride is calcium hydride.

3. The process of claim 1 wherein said catalyst comprises between about 0.1 and about 20 weight percent nickel, calculated as elemental nickel.

4. A process for the preparation of a normally solid ethylene polymer, which process comprises contacting ethylene and a liquid hydrocarbon reaction medium at a temperature between about 20° C. and about 250° C. under an ethylene partial pressure of at least about 50 p. s. i. with an alkaline earth metal hydride and a nickel catalyst comprising essentially between about 3 and about 15 weight percent of a material selected from the class consisting of nickel and nickel oxide, calculated as elemental nickel, supported upon an active carbon, the ratio of said metal hydride to said nickel catalyst being between about 0.01 and about 10, and separating a normally solid ethylene polymer thus produced.

5. The process of claim 4 wherein said nickel catalyst comprises essentially elemental nickel supported upon an active carbon.

6. The process of claim 4 wherein said catalyst comprises essentially NiO supported upon an active carbon.

7. The process of claim 4 wherein said hydride is calcium hydride, the calcium hydride:nickel catalyst ratio is between about 0.3 and about 2.0, and the ethylene partial pressure is between about 1000 and about 5000 p. s. i.

8. The process of claim 4 wherein said liquid hydrocarbon reaction medium is a xylene.

9. The process of claim 4 wherein said liquid hydrocarbon reaction medium is decalin.

10. The process of claim 4 wherein said liquid hydrocarbon reaction medium is benzene.

11. The process of claim 4 wherein said liquid hydrocarbon reaction medium is toluene.

12. The process of claim 1 wherein said carbon is a wood charcoal.

13. The process of claim 1 wherein said carbon is a coconut charcoal.

14. The process of claim 4 wherein said carbon is a wood charcoal.

15. The process of claim 4 wherein said carbon is a coconut charcoal.

References Cited in the file of this patent

UNITED STATES PATENTS

| | | |
|---|---|---|
| 2,460,303 | McAllister | Feb. 1, 1949 |
| 2,658,059 | Peters et al. | Nov. 3, 1953 |